INVENTORS
RALPH E. PRICE
BY WILLIAM E. HAPPEL
Hugh N Rocko
ATTORNEY

United States Patent Office 3,124,257
Patented Mar. 10, 1964

3,124,257
WORK TRANSFER APPARATUS FOR
MACHINE TOOLS
Ralph E. Price and William E. Happel, Waynesboro, Pa.,
assignors to Landis Tool Company, Waynesboro, Pa.
Filed Nov. 18, 1960, Ser. No. 70,197
3 Claims. (Cl. 214—1)

This invention relates to transfer apparatus for machine tools, particularly crank grinders, and more particularly, to transfer apparatus where unground workpieces are picked up and ground workpieces are deposited at the same end of the machine.

Previous transfer devices in which the unground work was picked up at one side of the machine and the ground work was deposited at the other side of the machine, had the hook supporting means spaced an amount equal to the distance between the point of operation of the machine and the point of pick-up for discharge. This distance had to be traversed between the removal of a ground workpiece and the insertion of an unground workpiece.

It is, therefore, an object of the present invention to provide a transfer device on which the load and unload hooks are positioned side by side so that workpieces are supported in end to end relation.

Another object is to provide a transfer device on which the work holding units travel only the length of one workpiece between machine load and unload positions.

Another object is to provide a transfer device which can be adapted to a machine which receives workpieces from one side and discharges on the other side, or a machine which receives and discharges workpieces on the same side.

Another object is to provide a transfer device in which the carriage has a long range movement and a short range movement.

Another object is to provide means for operating the load and unload hooks independently of one another.

Figure 1:
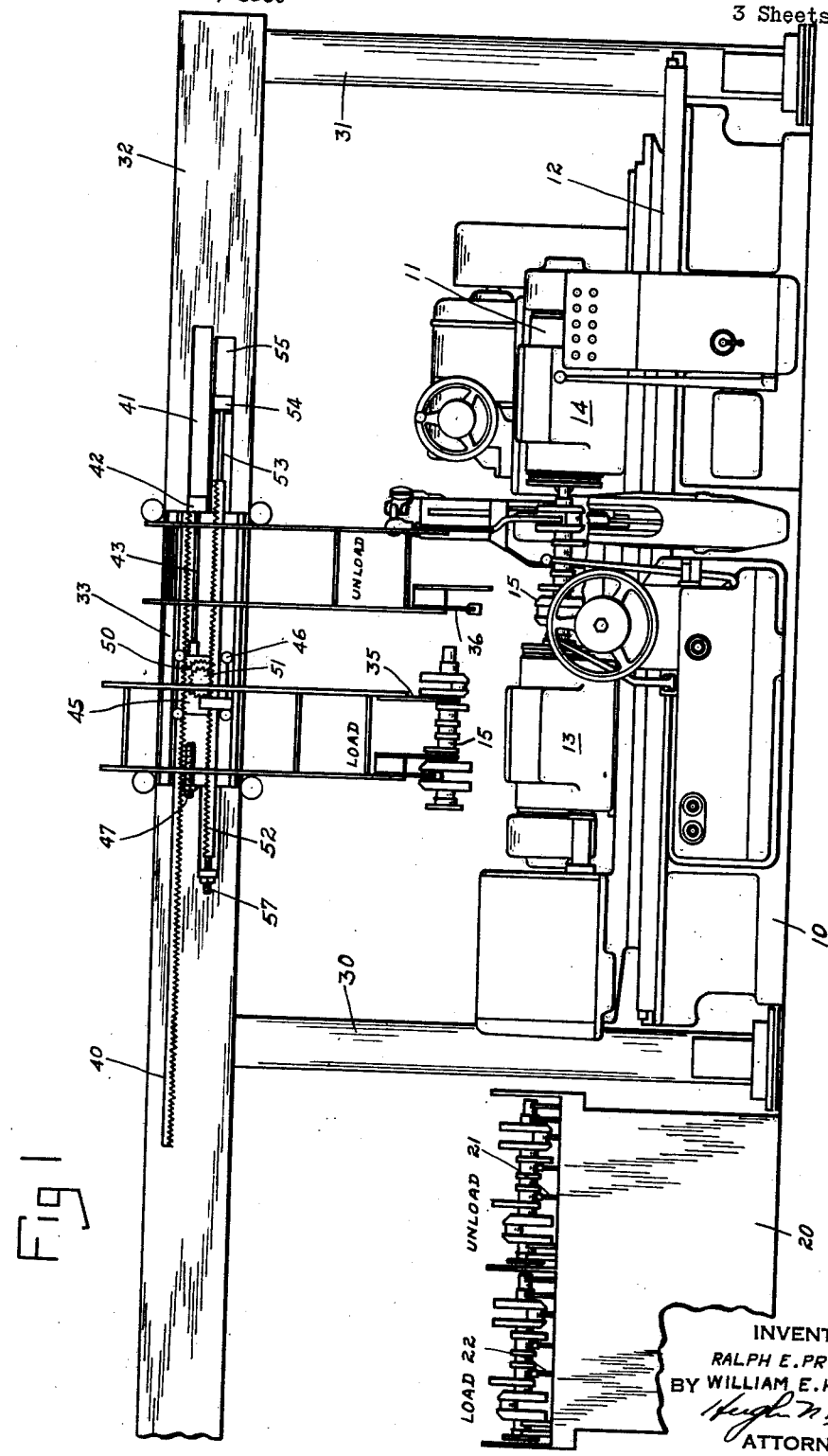
FIG. 1 is a front elevation of a crank grinding machine and associated work handling apparatus.
Figure 2:
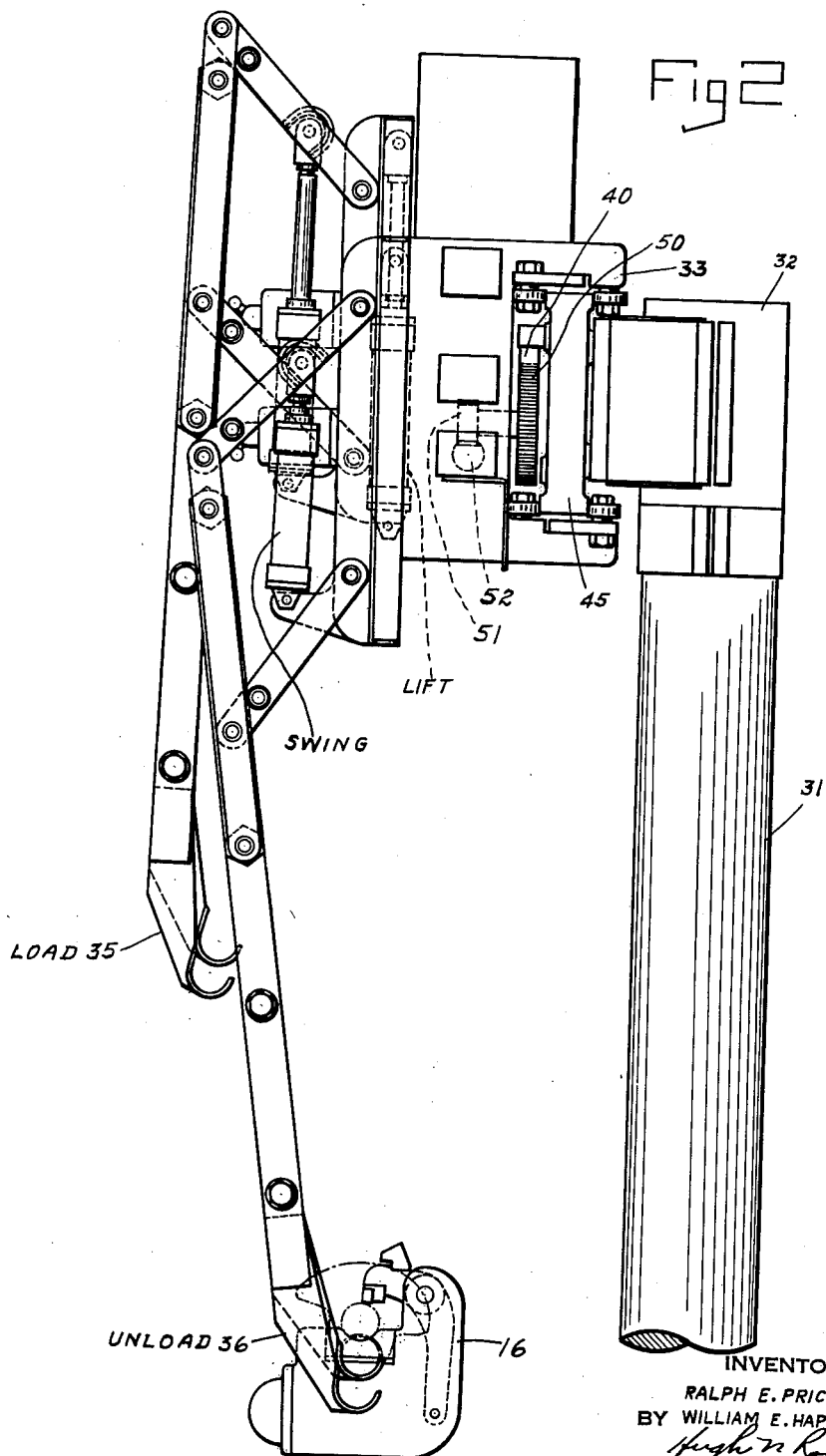
FIG. 2 is an end elevation of a portion of the transfer apparatus, specifically the hooks and hook actuating mechanism.
Figure 3:
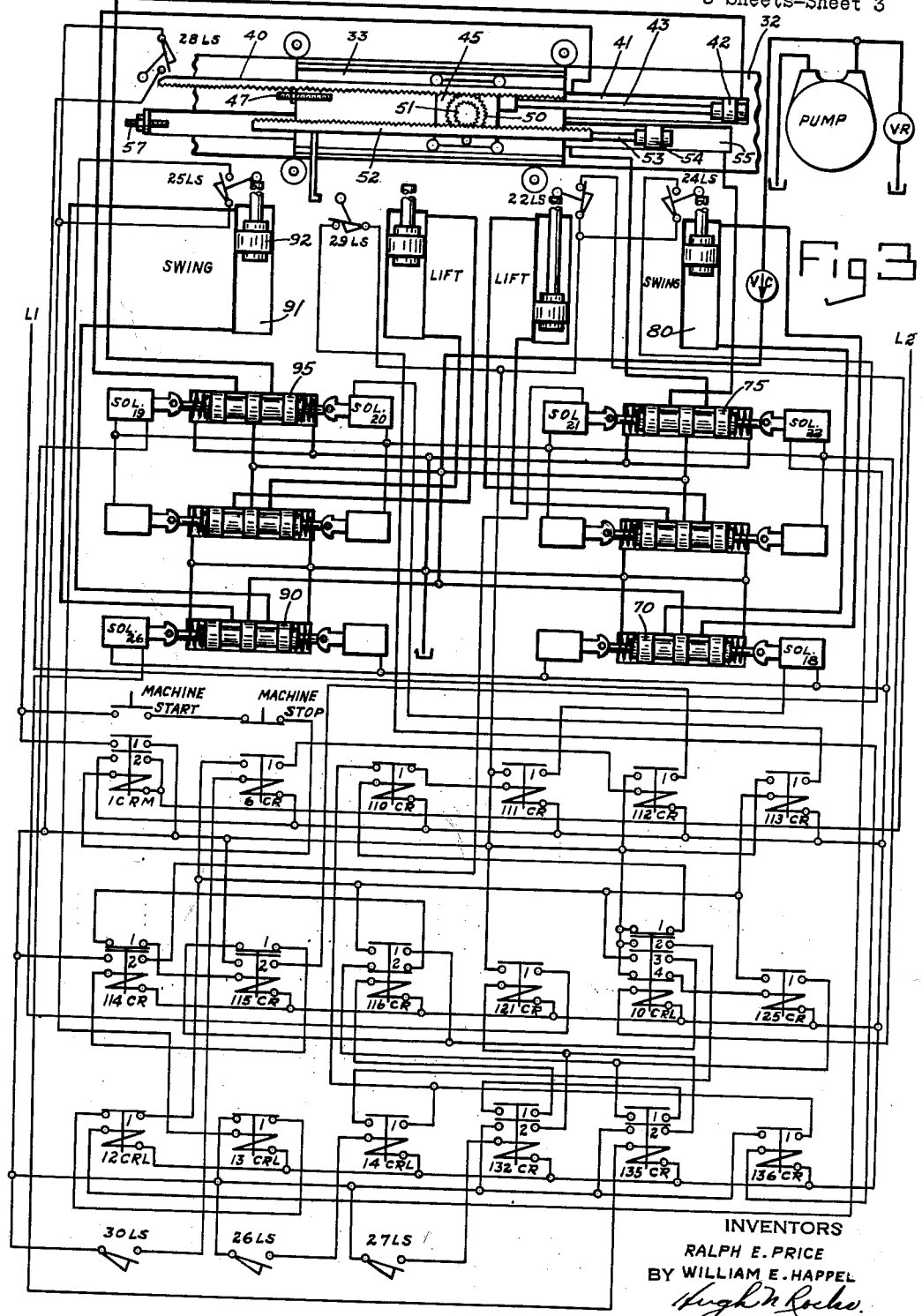
FIG. 3 is a hydraulic and electric circuit.

The bed of a crank grinding machine is indicated by 10 from which is mounted a grinding wheel support 11 and a work carriage 12. On work carriage 12 are crank heads 13 and 14 having conventional clamping fixtures 16 for rotating a workpiece 15.

At the left end of the crank grinding machine is a conveyor mechanism 20 having a conveyor 21 which receives workpieces from a preceding operation and also from the operation with which this invention is concerned. The conveyor mechanism 20 also includes a conveyor 22 which supplies unground workpieces for the preceding operation The transfer apparatus consists of a pair of support members 30 and 31 for supporting a horizontal member 32 which serves as a track for carriage 33. Carriage 33 supports a pair of closely spaced crank handling hooks, load hooks 35 and unload hooks 36. The means for actuating hooks 35 and 36 is described in detail in U.S. Patent 2,867,058, granted January 6, 1959, and only such details as are essential to the present invention are described here. Carriage 33 is provided with two movements which are described as a traverse movement and a shift movement. The term "traverse" as used here refers to the movement of carriage 33 between conveyors 21 and 22 and the machine.

The term "shift" as used here refers to the movement of carriage 33 between the load and unload positions either in relation to the machine or to conveyors 21 and 22.

The traverse movement is the same as disclosed in the above mentioned Patent 2,867,058. It consists of a rack 40 attached to track 32. A hydraulic cylinder 41 having a piston 42 is mounted on carriage 33. Piston rod 43 of piston 42 is connected to traveler member 45 having rollers 46 for movement longitudinally of carriage 33. Traveler member 45 has rotatably mounted thereon a large pinion 50 for engaging rack 40 and a small pinion 51 for engaging shift rack 52 slidably mounted on carriage 33. There is no connection between traveler member 45 and carriage 33 except through pinion 51 and rack 52. When traveler member 45 is shifted by means of the traverse piston 42 which is mounted on carriage 33, pinion 51 and rack 52 only, have means for rotating pinion 50 in engagement with rack 40 to move the entire combination of traveler member 45, carriage 33, cylinder 41 and piston 42 along rack 40 and track 32. As shown, pinions 50 and 51 are in a ratio of 3 to 1. This ratio may be varied to conform to variations in traverse requirements.

The present invention differs from that disclosed in the above mentioned patent in that the rack 52, instead of being attached to carriage 33, is slidably mounted on said carriage to provide a short traverse movement referred to above as a shift movement. For this function, shift rack 52 is connected through piston rod 53 with a piston 54 in cylinder 55. Cylinder 55 is also attached to carriage 33. An adjustable stop 47 limits the movement of traveler member 45 to the left. Adjustable stop 57 limits the movement of shift rack 52 to the left. For a shift movement, shift piston 54 and rack 52 move on carriage 33 in engagement with pinion 51. For a shift left movement, pinions 50 and 51 rotate in a clockwise direction. Pinion 50 in engagement with rack 40 moves to the left more rapidly than rack 52 and the difference is transmitted back through pinion 51 and rack 52 and becomes the movement of carriage 33.

*Operation*

At the end of the Traverse Right movement, traverse piston 42 is in its left hand position with shift piston 54 in the left hand position, and the loader is in the Shift Left position with the empty unload hooks 36 above the workpiece in the machine. This may be considered the starting position for the transfer cycle.

The signal to start the cycle comes from the Cycle Start Switch for manual start, or from the Traverse Right limit switch 29LS, with the machine operating automatically.

In either case, unload hooks 36 are in the Lift Down-Swing Up position so that the starting signal would energize Unload Swing Down relay 111CR.

As shown in the above mentioned Patent 2,867,058, each set of hooks 35 and 36 has a vertical lift movement and also a swinging movement. These movements occur in sequence, never simultaneously.

The function of the swinging movement, hereafter referred to as Swing Up or Swing Down, is to move the cranks laterally into or out of clamping fixtures 16 and to position the hooks prior to a Lift Up movement to remove a workpiece from the machine or to swing the hooks away after a Lift Down movement to deposit a workpiece in the machine.

The function of the vertical lift movement, hereafter referred to as Lift Up or Lift Down, is to deposit the cranks in the fixtures 16 after a Swing Down movement to free the hooks from the crank prior to a Swing Up movement or to move the hooks upwardly to lift a crank free of the machine prior to a Swing Up movement.

The right hand hooks which remove the finished workpiece from the machine and deposit on the conveyor 21 will be referred to as the unload hooks. The left hand hooks which pick up a workpiece from the conveyor 21 and deposit it in the machine will be referred to as the load hooks.

In the present invention, we are concerned only with the sequence of the traverse and shift movements. The lift and swinging movements will be referred to only where they have a direct bearing on the traverse or shift movements of the loader.

The traverse movement is the movement of the loader between the machine and conveyor. The shift movement is a secondary movement of the loader in either of the end positions of the traverse movement, or even in an intermediate traverse position, if necessary.

In starting position, unload hooks 36 are in the Lift Down position and their first movement will be to swing down to a position below the workpiece to remove the workpiece from the machine. Thus in the Lift Down position, Unload Lift limit switch 22LS is closed.

If the machine has not been operating previously, the closing of the Cycle Start Switch will energize relay 1CRM.

Contacts 1CRM1 and 1CRM2 will close to supply current for the entire circuit.

Limit switch 22LS being closed, will energize relay 10CRL. Relay contact 10CRL2 will close in the circuit to Unload Swing Down relay 111CR.

Carirage 33, being in the Shift Left position, Shift Left limit switch 26LS will be closed to energize relay 14CRL and also relay contact 14CRL1 in the circuit to relay 111CR will be closed.

Unload Swing Up relay 110CR will be deenergized because of the opening of normally closed relay contact 10CRL1. Normally closed relay contact 110CR1 will be closed in the circuit to relay 111CR.

Thus, Unload Swing Down relay 111CR will be energized and will energize valve solenoid 18 which shifts valve 70 to the left to direct fluid under pressure to the upper end of Unload Swing Down cylinder 80 to place the hooks under workpiece 15. The hooks left up to remove the workpiece from the clamping fixture 16 and return to Swing Up position.

If the machine has been in operation, a signal to energize relay 111CR will come from the Traverse Right limit switch 29LS which is closed in the Traverse Right position to energize relay 136CR. Relay contact 136CR1 closes in a circuit parallel to the previously described circuit for relay 111CR and completes a circuit through normally closed relay contact 110CR1, to energize relay 111CR and Unload Swing Down valve solenoid 18 with the resultant movement described above.

When unload hooks 36 move to the Lift Up position after picking up a shaft, limit switch 22LS opens to deenergize relay 10CRL. Normally closed relay contact 10CRL4 closes to energize relay 125CR. Contact 125CR1 closes in the circuit through normally closed relay contacts 116CR2 and 114CR1 to Loader Shift Right relay 115CR.

The upward movement of the hooks continues through the Swing Up position at the end of which limit switch 24LS is opened to deenergize relay 12CRL. Normally closed relay contact 12CRL1 completes a circuit through relay contact 125CR1, and normally closed relay contacts 116CR2 and 114CR1 to relay 115CR.

Contact 115CR2 energizes Loader Shift Right valve solenoid 22 which shifts valve 75 to the left, directing fluid to the left end of shift cylinder 55, moving piston 54 and rack 52 to the right and rotating pinions 50 and 51 in a counter-clockwise direction.

Pinion 50, in engagement with rack 40, moves carriage 33 to the right a distance greater than the piston movement because of the difference in diameter of pinions 50 and 51, to position load hooks 35 with an unground shaft above fixtures 16. This movement of carriage 33 closes the Loader Shift Right limit switch 27LS to energize relay 132CR. Contact 132CR2 closes to energize Load Swing Down relay 121CR and valve solenoid 26.

Load Swing Down valve solenoid 26 shifts valve 90 to the right, directing fluid under pressure to the upper end of Swing Down cylinder 91, moving piston 92 downwardly and swinging the hooks 35 to place workpiece 15 in fixtures 16.

The load hooks 35 then lift down and swing up, opening Load Swing limit switch 25LS to deenergize relay 13CRL. Relay contact 13CRL1 closes a circuit through relay contacts 12CRL1 and 6CR1 to energize Loader Traverse Left relay 112CR and valve solenoid 19 which shifts valve 95 to the right, directing fluid under pressure to the left hand end of traverse cylinder 41, moving piston 42 and traveler 45 to the right.

Pinions 50 and 51 rotate in a clockwise direction causing pinion 50, in engagement with stationary rack 40, to move traveler 45 and carriage 33 to the left. Carriage 33 moves to the left in the Shift Right position. When carriage 33 reaches the left position, the empty load hooks 35 are over the conveyor 21.

If there is no shaft in the pick-up position on the conveyor, limit switch 30LS will be opened, relay 6CR will be deenergized, and relay contact 6CR1 in the relay 112CR circuit will remain open to prevent energizing relay 112CR, and thus prevent the Traverse Left movement.

In the Traverse Left position as described, the Traverse Left limit switch 28LS closes to energize relay 135CR. Relay contact 135CR2 completes a circuit to energize Load Swing Down relay 121CR. Relay contact 121CR1 energizes Load Swing Down valve solenoid 26 which again shifts valve 90 to the right, directing fluid to the upper end of Load Swing cylinder 91. Piston 92 moves downwardly to swing the load hooks 35 to pick up a workpiece 15 from the conveyor 21.

Upon return to the Swing Up position, Load Swing limit switch 25LS opens to deenergize relay 13CRL. Normally closed relay contact 13CRL1 closes. In the meantime, relay contact 135CR1 closes to complete a circuit which includes relay contacts 13CRL1, 12CRL1, 125CR1 and 132CR1, to energize relay 116CR.

Normally closed contact 116CR2 opens the circuit through normally closed relay contact 14CR1 to deenergize relay 115CR. Contact 116CR1 closes and completes a circuit through normally closed relay contact 115CR1 to energize Loader Shift Left relay 114CR.

Relay contact 13CRL1 being closed as described above, the circuit to relay 114CR is completed through relay contacts 12CRL1, 116CR1 and 115CR1, and relay 114CR is energized. Relay contact 114CR2 closes to energize Loader Shift Left valve solenoid 21 which shifts valve 75 to the right, directing fluid under pressure to the right hand end of Shift cylinder 55, shifting carriage 33 to the left to position unload hooks 36 over conveyor 21.

Loader Shift Left limit switch 26LS closes to energize relay 14CRL. Relay contact 14CRL1 closes to complete a circuit through relay contact 110CR1 to energize Unload Swing Down relay 111CR.

Relay contact 111CR1 closes to energize Unload Swing Down valve solenoid 18 which shifts valve 70 to the left to direct fluid to the upper end of Unload Swing cylinder 80.

Unload hooks 36 swing down to deposit the ground crankshaft on conveyor 21. The unload hooks 36 then return to Swing Up position, but not in the Lift Up position.

At the end of the Swing Up position, Unload Swing limit switch 24LS is opened to deenergize relay 12CRL. Normally closed relay contact 12CRL1 closes to energize Traverse Right relay 113CR. Relay contact 113CR1 closes to energize Traverse Right valve solenoid 20 which shifts valve 95 to the left, directing fluid under pressure to the right hand end of traverse cylinder 41.

Piston 42 moves traveler 45 to the left, causing pinions 50 and 51 to rotate in a counter-clockwise direction. Pinion 51, rotating in a counter-clockwise direction in engagement with rack 40, causes carriage 33 to traverse to the right to position unload hooks 36 above workpiece 15 in the machine to await the completion of the grinding operation and the beginning of another transfer cycle.

We claim:

1. A work transfer apparatus for a machine tool comprising a support member, a horizontal track on said support member, a carriage on said track, work handling means on said carriage, means for traversing said carriage between two terminal positions, said traversing means comprising a piston and cylinder on said carriage, one of which is attached to a traveler member, said traveler member having a pair of pinions, a rack on said track in engagement with one of said pinions, a rack on said carriage in engagement with the other of said pinions, movement of said traveler member relative to said second rack causing rotation of said pinions whereby to traverse said traveler member and said carriage relative to said first rack to traverse said carriage between said two terminal positions, and means to actuate said second rack to rotate said pinions to move said carriage relative to said first rack whereby to provide a short range traversing movement of said carriage in any position on said track.

2. A work transfer apparatus for a machine tool comprising a support member, a horizontal track on said support member, a carriage on said track, means for traversing said carriage between a position adjacent the point of operation of the machine tool and a position for picking up and depositing workpieces, said carriage having two sets of work handling hooks spaced less than the distance between said two positions, a movable member having a pair of pinions, a rack on said track in engagement with one of said pinions, a rack on said carriage in engagement with the other of said pinions, a piston and cylinder connected to said movable member and having a stroke which is a predetermined fraction of the distance moved by said carriage to transfer the work handling hooks between said point of operation and said pick up and deposit position, to move said carriage between the point of operation and the point of pick-up and deposit, a second piston and cylinder connected to the rack on said carriage and having a stroke which is a predetermined fraction of the center to center distance between said two sets of hooks to successively position each of said sets of hooks in operative relation to said point of operation or said point of pick-up and deposit.

3. A work transfer apparatus for a machine tool comprising a support member, a horizontal track on said support member, a carriage on said track, means for traversing said carriage between a position adjacent the point of operation of the machine tool and a position for receiving unfinished workpieces and discharging finished workpieces, said carriage having two sets of work handling hooks in adjacent relation, a movable member on said carriage having a pair of pinions, a rack attached to said track in engagement with one of said pinions, a rack slidably mounted on said carriage in engagement with the other of said pinions, a piston and cylinder on said carriage connected to said movable member, said racks and said pinions being arranged to amplify the movement of said piston and cylinder to move said carriage between the point of operation of the machine tool and the point of receiving unfinished workpieces and discharging finished workpieces, a second piston and cylinder connected to said slidably mounted rack, the movement of said slidably mounted rack being amplified by said pinions and said other rack to move one set of hooks out of operative relation and the other set of hooks into operative relation either at the point of operation of the machine tool or at the position for discharging a finished workpiece and picking up an unfinished workpiece.

References Cited in the file of this patent

UNITED STATES PATENTS

| | | |
|---|---|---|
| 2,653,502 | Meyer | Sept. 29, 1953 |
| 2,867,058 | Balsiger | Jan. 6, 1959 |
| 2,894,616 | Young | July 14, 1959 |
| 2,978,117 | Thompson | Apr. 4, 1961 |